Sept. 8, 1970     S. G. HJELMQUIST     3,527,034
POWER TRANSMISSIONS FOR LAWNMOWERS
Filed June 18, 1968     3 Sheets-Sheet 2
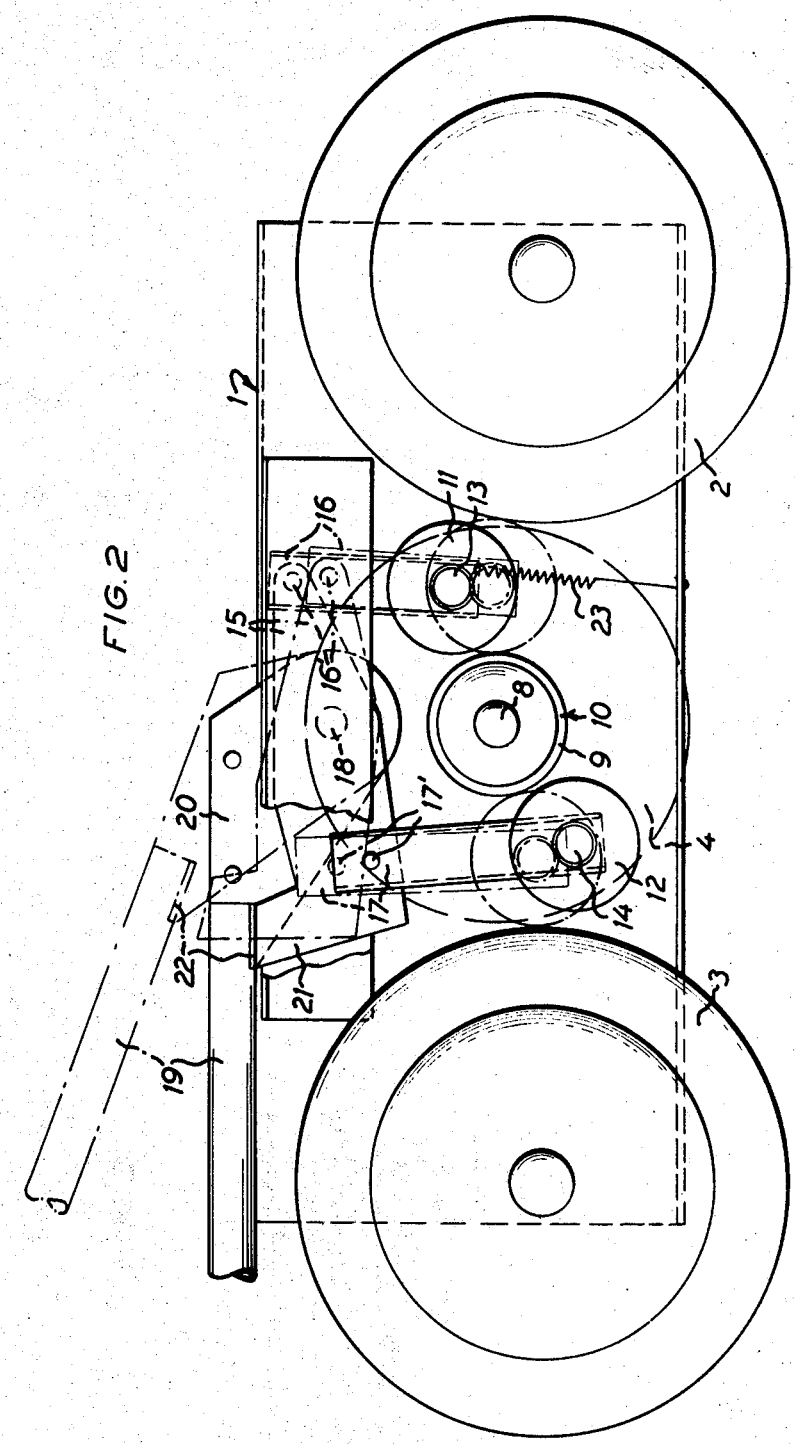
INVENTOR:
STIG GUNNAR HJELMQUIST

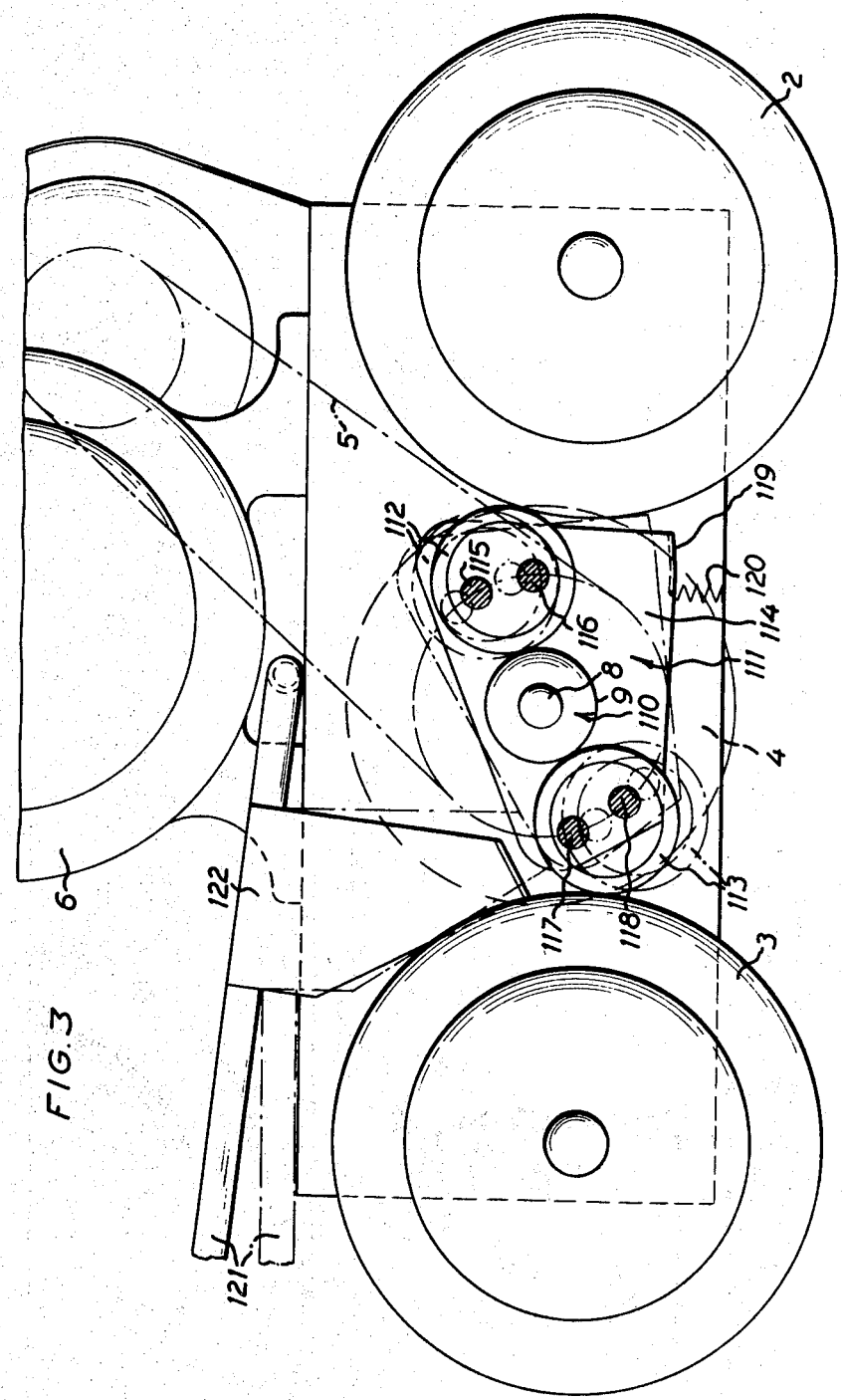

United States Patent Office 3,527,034
Patented Sept. 8, 1970

3,527,034
POWER TRANSMISSIONS FOR LAWNMOWERS
Stig Gunner Hjelmquist, Box 6, 57300 Tranas, Sweden
Filed June 18, 1968, Ser. No. 738,001
Claims priority, application Sweden, June 20, 1967,
8,703/67
Int. Cl. A01d 35/24
U.S. Cl. 56—26   4 Claims

ABSTRACT OF THE DISCLOSURE

A power transmission device for self-propelled cylinder type lawnmowers comprises a drive shaft, preferably cutter shaft, mounted midway between two traveling wheels and in parallel with the axles thereof, a drive roller or pinion arranged on said drive shaft and being caused to transmit drive power to the traveling wheels over intermediate wheels shiftable in a radial plane, the distance between the drive roller or pinion and the peripheries of the traveling wheels being so adapted relative to the diameter of the intermediate wheels that upon rotation of the drive roller or pinion by the intermediary of a motor, the intermediate wheels are urged in between the roller or pinion and the peripheries of the traveling wheels thereby transmitting drive power to the said wheels. The device also includes means by which the intermediate wheels can be shifted from the power transmitting position to a non-operative position.

---

This invention relates to a device for transmitting power to the traveling wheels of wheeled implements, preferably motor lawnmowers, equipped with motor-driven rotary cutter means.

Characteristic of this device is that it comprises a drive roller or pinion mounted in the plane of the traveling wheels of the implement on a drive shaft rotating together with the cutter and preferably extending in parallel with the wheel axles, a shiftable intermediate wheel located between said drive roller and a peripheral portion of the traveling wheel, that the radial distance between the drive roller and the opposite peripheral portion of the traveling wheel is smaller than the outer diameter of the intermediate wheel, that the center of the intermediate wheel is at a distance from a plane extending through the axes of the drive roller and the traveling wheel, that the intermediate wheel is shiftable towards and away from said plane and as it approaches said plane enters into engagement with the drive roller and the periphery of the traveling wheel, whereas it is disengaged from at least one of said two parts as it moves away from said plane, that when shifted towards said plane upon rotation of the drive roller by the motor the intermediate wheel is adapted to be carried along by the drive roller in the rotation thereof and under wedge action and simultaneous transmission of torque to the periphery of the traveling wheel to produce rotation of the traveling wheel, but when the drive roller is at rest while the traveling wheel is rotated in the direction of propulsion said intermediate wheel is kept disengaged from the periphery of the traveling wheel with the aid of a manually or automatically operating device.

For better elucidation, the invention will be more fully described in the following with reference to the accompanying drawings in which:

FIG. 2 is a diagrammatic side view, on a larger scale, of an embodiment of the power transmission device at the traveling wheels on one side of the lawnmower;

FIG. 3 is a similar diagrammatic side view of a modified embodiment of the power transmission device.

Figure 1:
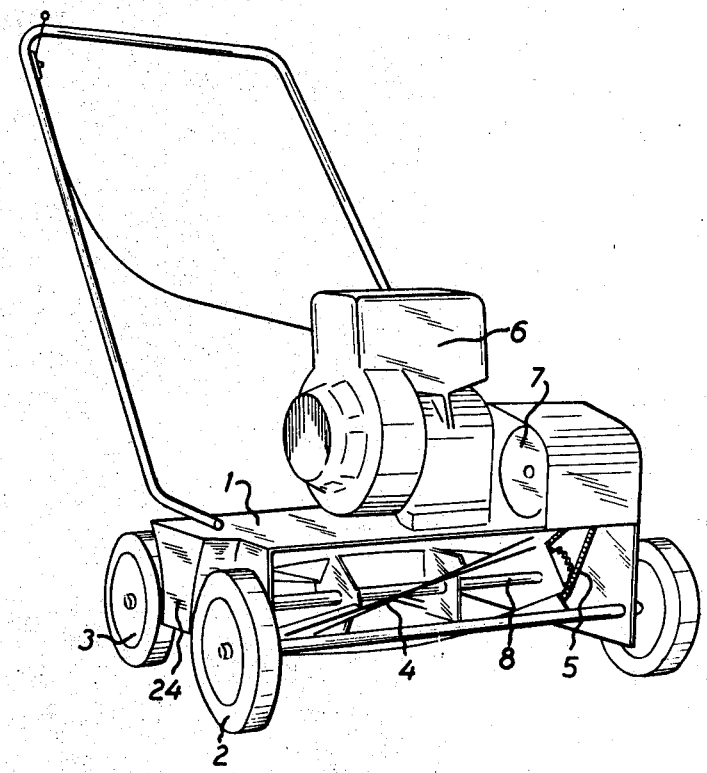
FIG. 1 is a perspective view, as seen obliquely from in front of a lawnmower having a power transmission device according to the invention.

The lawnmower has a sheet metal frame 1 and front and rear traveling wheels 2, 3 non-displaceably mounted thereto. Likewise non-displaceably mounted in the frame between the wheel axles is a rotary cutter 4 which is driven with the aid of a chain 5 by a motor 6 over a suitable transmission 7.

Common to the two embodiments of the power transmission device is that at each end of the cutter shaft 8, which is preferably in the form of an insert shaft, there is mounted a drive roller 10 having a frictional coating 9 or gear teeth so as to enable it to rotate together with the cutter shaft.

In the embodiment illustrated in FIG. 2, a possibly toothed intermediate wheel 11 and 12, respectively, is disposed between the drive roller 10 and the periphery of each traveling wheel 2, 3. The intermediate wheels are individually mounted on journals 13 and 14, respectively, at the lower ends of arms 16 and 17, respectively, pivotally mounted to a rocking member 15. The rocking member 15 is in turn is mounted for pivotment on a pivot 18 which is stationary in relation to the frame 1 and also serves as a pivot for the end plate 20 of the handle 19. The rocking member 15 at the rear end has an upstanding projection 21 with which engages a lug 22 on the end plate 20 of the handle so that when the handle is in the lower position shown by full lines the rear end of the rocking member 15 is kept pressed down, the intermediate wheels being maintained spaced from the drive roller 10 but in slight application with the peripheries of the traveling wheels. When, however, the handle is swung to the upper position shown by dash-and-dot lines the lug 22 is disengaged from the projection 21 and the rocking member is swung under the action of the spring 23 to the position shown by broken lines, the intermediate wheels drivingly engaging both the drive roller and the peripheries of the respective traveling wheels.

The intermediate wheels 11 and 12 are of a diameter that exceeds the free distance between the periphery of the drive roller and those of the traveling wheels 2, 3, and the arms 16, 17 have such a length dimension that the axle 13 of one intermediate wheel will lie above a plane passing through the axle of the front traveling wheel 2 and the axis of the drive roller 10, while the axle 14 of the other intermediate wheel 12 will be beneath a plane passing through the axle of the rear traveling wheel 3 and the axis of the drive roller 10.

By the arrangement that the cutter shaft 8 will rotate in the same sense as the traveling wheels rotate when the lawnmower is propelled in a forward direction and the axle 13 of the intermediate wheel positioned between the front traveling wheel and the drive roller lies above said plane while the axle 14 of the intermediate wheel positioned between the rear traveling wheel and the drive roller lies below it, the drive roller 10 upon rotation of the cutter shaft 8 and with the rocking member 15 swung into such a position that the intermediate wheels 11 and 12 contact both the drive roller 10 and the peripheries of the traveling wheels, will carry along the intermediate wheels in its rotation, thus urging them into the spaces between the drive roller and the traveling wheels, whereby the traveling wheels will be caused to rotate.

As soon as driving engagement has been established between the drive roller 10, the intermediate wheels 11, 12 and the traveling wheels 2, 3, the intermediate wheels 11, 12 will be automatically kept in position contacting the peripheries of the traveling wheels. Thus, the spring 23 only has the task of ensuring, when the rocking member is swung from one position to the other, that an initial engagement is established between primarily the intermediate wheels and the traveling wheels. Since the pivot axes 16' and 17' of the arms 16, 17 carrying the intermediate wheels are spaced a greater distance apart on the rocking member 15 than the distance between the opposite peripheral points of the two traveling wheels, the intermediate wheels will by gravity tend to go into contact with the peripheries of the traveling wheels. Therefore the spring 23 only has the task of ensuring that the engagement between the intermediate wheels and the traveling wheels is established.

When it is desired to stop the forward propulsion of the lawnmower the handle 19 is swung downwards to cause the lug 22 on the end plate of the handle to engage the projection 21 on the rocking member 15 swinging said member downwards with the rear end, the intermediate wheels 11, 12 being moved with the aid of arms 16 and 17, respectively, out of engagement with the peripheries of the traveling wheels 2, 3. As soon as the handle is again swung upwards the rocking member will return under the action of the spring 23 to the position it takes when the lawnmower is propelled, the intermediate wheels engaged with the traveling wheels being again moved into driving engagement.

When the lawnmower is pushed in a forward direction by hand with the motor at rest the handle is preferably kept in the release position so that the intermediate wheels are only in slight contact with the traveling wheels. Even if the handle is kept in the driving position no appreciable power is transmitted from the traveling wheels to the drive roller 10 because no operative driving engagement can be established between the traveling wheels, the intermediate wheels and the drive roller since the rotation of the traveling wheels as well as the existence of the spring 23 counteracts building up of an operative clamping engagement between the traveling wheels, the intermediate wheels and the drive roller.

As will be seen from FIG. 1, a protective member 24 is so mounted to the lawnmower frame 1 as to entirely enclose the intermediate wheels and the drive rollers. The upper edge of the protective member furthermore is localized in such a way as to prevent, for instance when the drive rollers or the intermediate wheels are heavily worn, that the rocking member 15 is swung so much that the intermediate wheels go past the narrowest point between the drive roller and the peripheries of the traveling wheels.

In the modified embodiment illustrated in FIG. 3, one rocking member 111 is pivoted to each end of the cutter shaft 8, and sleeves 112, 113 corresponding to the intermediate wheels are arranged between the drive or friction roller 110 and the traveling wheels 2, 3. Each rocking member 111 actually comprises two rigidly connected side pieces 114, but for greater clarity one side member has been omitted in the modification illustrated. The sleeves 112 and 113 which consist of preferably knurled or toothed cylinders of relatively small wall thickness in position of rest loosely engage the drive roller 10 and the peripheries of the traveling wheels 2, 3. The sleeves have no proper central mounting. The sleeves are kept in position, leaving a large radial clearance, with the aid of axial pins 115, 116 and 117, 118, respectively, which are secured in the side pieces of the rocking member 111. The diameter of each transmission sleeve 112 and 113 like that of the intermediate wheels in the earlier described embodiment is larger than the free distances between the drive roller 10 and the peripheral portions of the traveling wheels 2, 3 facing said roller, so that the assumed centres of the transmission sleeves will be spaced from the planes connecting the wheel axles and the cutter shaft. As will be seen from FIG. 3 the cutter shaft 8 is also spaced from a plane containing the two wheel axles. Considering that the cutter shaft 8 rotates in the same sense as the traveling wheels upon forward propulsion of the lawnmower and the assumed centres of the sleeves 112 associated with the front wheels 2 are situated above one of said planes containing the wheel axles and the cutter shaft, while the assumed centres of the sleeves 113 associated with the rear wheels 3 are situated beneath the other of said planes, the sleeves 112, 113 upon rotation of the cutter shaft 8 will be carried along by the drive roller 10 with which the sleeves are kept in slight engagement in position of rest with the aid of the pins 116 and 117, and under clamping action the sleeves will be urged against the peripheries of the traveling wheels 2, 3 and simultaneously rotated, whereby the traveling wheels will also be rotated thus propelling the lawnmower.

As already mentioned, each rocking member 111 is pivotally mounted on the cutter shaft 8. The pivotment of the rocking member in the direction of rotation of the cutter shaft is restricted in such a way by means of a tongue 119 engaging the lower edge of the lawnmower frame that the rocking member 111 when the drive roller 10 is heavily worn is prevented from tilting over so that the sleeves 112, 113 go past the planes connecting the wheel axles and the cutter shaft. A spring 120 should also be arranged on the rocking member 111 in order to keep in normal position the pins 116 and 117 applied against the inner sides of the sleeves so that the latter in turn are kept engaged with the drive roller 10. At the starting of the lawnmower this will make it easy for the sleeves to enter into driving engagement with the traveling wheels. When the rocking member 111 under manual actuation is swung in the sense opposite to the direction of rotation of the cutter shaft 8 the sleeves will be moved out of driving engagement with the drive roller and/or the periphery of the traveling support wheels in that the pins 115 and 118 engage the opposite sides of their respective sleeves. The power transmission to the traveling wheels will thus be interrupted so that the lawnmower stops. The means for manually actuating the rocking member 111 comprises downwardly extending projections 122 disposed at the vertically swingable handle 121, and when the handle is swung downwards to the position of rest indicated by dash-and-dot lines the projections are adapted to engage the rear end portions of each rocking member and to swing said members in a sense opposite to the direction of rotation of the cutter shaft. As already mentioned, the sleeves 112, 113 are thereby moved out of driving engagement. When the handle 121 is raised to the driving position illustrated by full lines the rocking members 111 will return under the action of the spring 120 and the rotation of the cutter shaft to the position in which the transmission sleeves will engage the drive roller and the peripheries of the traveling wheels. When, on the other hand, the cutter shaft 8 is at rest and the lawnmower is pushed forwards by hand the sleeves 112, 113 will be carried along by the traveling wheels irrespective of the position of the rocking member by reason of ample clearance, an operative power transmiting engagement being thus made impossible between the peripheries of the traveling wheels and the stationary drive rollers.

It is obvious that the power transmission device according to the invention is applicable also to implements other than lawnmowers, such as rotary cultivators and the like.

While the invention has been elucidated in connection with the embodiments described above and illustrated in the accompanying drawings, those skilled in the art will readily understand that the invention can be modified in several ways within the scope of the appended claims.

What I claim and desire to secure by Letters Patent is:

1. A device for use in transmitting power to traveling wheels of a wheeled implement such as a lawnmower including transversely spaced front and rear axles and two pairs of traveling wheels mounted on said front and rear axles respectively, a cutter shaft mounted for rotation in parallel between the front and rear axles and having a rotary cutter means, and power means for driving the cutter shaft; the device comprising in combination a pair of drive rollers mounted on the opposite ends of said cutter shaft respectively to be rotatable therewith, two pairs of intermediate wheels mounted respectively on opposite sides of said drive rollers between said drive rollers and the adjacent front and rear traveling wheels for transmitting motion from the drive rollers to the front and rear traveling wheels, the intermediate wheels associated with said front traveling wheel being spaced above a first plane passing between the front axle and the cutter shaft while the intermediate wheels associated with the rear traveling wheels being spaced below a second plane passing through the rear axle and said cutter shaft, the radial distance between the drive rollers and the opposite peripheral portions of the front and rear traveling wheels being smaller than the outer diameter of the intermediate wheels, and means for moving said intermediate wheels towards said planes for engaging the drive rollers and the peripheries of the associated traveling wheels to transmit motion from the drive rollers to the associated traveling wheels, and away from said planes for disengaging from the drive rollers and the associated traveling wheels.

2. The device defined in claim 1 wherein said means for moving said intermediate wheels towards and away from said drive rollers includes a rocking member mounted for pivotal movement about an axis so that upon pivotal movement of said rocking member said intermediate wheels are shifted into or out of driving engagement with the drive rollers and the peripheries of the traveling wheels.

3. The device defined in claim 2 wherein said pivotal axis of said rocking member is disposed above and in parallel to said cutter shaft between the front and rear axles, said rocking member having generally at its opposite ends front and rear arms depending downwardly and carrying said intermediate wheels, said rear arm being longer than said front arm so that the intermediate wheels associated therewith lie below said second plane while the intermediate wheels associated with said front arm lie below said first plane; and wherein said means for moving said intermediate wheels towards and away from said drive roller wheel further includes means for pivoting the rocking member including a manual control for pivoting the rocking member in one angular direction and spring means for urging the rocking member in the opposite angular direction.

4. The device defined in claim 2 wherein said rocking member is mounted for pivotal movement on said cutter shaft, said intermediate wheels are tubular sleeves each of which is supported by a pair of pins spaced apart and disposed at substantially equal distances from the axis of rotation of the drive rollers, the distance between the remote surface portions of the pins being less than the inner diameter of the sleeves so that the axis of rotation of said sleeves is radially shiftable.

References Cited

UNITED STATES PATENTS

| | | | |
|---|---|---|---|
| 3,025,922 | 3/1962 | Savidge | 180—74 X |
| 3,433,002 | 3/1969 | Custance | 56—26 |

LOUIS G. MANCENE, Primary Examiner

J. N. ESKOVITZ, Assistant Examiner

U.S. Cl. X.R.

56—1; 180—19, 74